(12) United States Patent
Graylin et al.

(10) Patent No.: US 7,263,516 B2
(45) Date of Patent: *Aug. 28, 2007

(54) SYSTEM FOR AND METHOD OF STORING AND ELABORATING USER PREFERENCES

(75) Inventors: William Graylin, Woburn, MA (US); William R. Campbell, Cambridge, MA (US); Fred Moses, Brookline, MA (US)

(73) Assignee: BEA Systems, Inc., San Jose, CA (US)

( * ) Notice: Subject to any disclaimer, the term of this patent is extended or adjusted under 35 U.S.C. 154(b) by 321 days.

This patent is subject to a terminal disclaimer.

(21) Appl. No.: 10/078,914

(22) Filed: Feb. 20, 2002

(65) Prior Publication Data

US 2003/0033415 A1   Feb. 13, 2003

Related U.S. Application Data

(60) Provisional application No. 60/270,076, filed on Feb. 20, 2001.

(51) Int. Cl.
*G06F 17/30* (2006.01)
*G06F 17/00* (2006.01)

(52) U.S. Cl. .................. 707/3; 707/9; 707/10; 707/102

(58) Field of Classification Search .................... 707/9, 707/3, 10, 102
See application file for complete search history.

(56) References Cited

U.S. PATENT DOCUMENTS

| | | | | |
|---|---|---|---|---|
| 5,854,923 A | * | 12/1998 | Dockter et al. | 707/5 |
| 5,978,811 A | * | 11/1999 | Smiley | 707/103 R |
| 6,029,171 A | * | 2/2000 | Smiga et al. | 707/102 |
| 6,154,741 A | * | 11/2000 | Feldman | 707/9 |
| 6,208,989 B1 | * | 3/2001 | Dockter et al. | 707/5 |
| 6,263,341 B1 | * | 7/2001 | Smiley | 707/103 R |
| 6,389,469 B1 | * | 5/2002 | Vekslar et al. | 709/226 |
| 6,400,996 B1 | * | 6/2002 | Hoffberg et al. | 700/83 |
| 6,564,244 B1 | * | 5/2003 | Ito et al. | 709/204 |
| 6,578,025 B1 | * | 6/2003 | Pollack et al. | 707/2 |
| 6,850,252 B1 | * | 2/2005 | Hoffberg | 715/716 |
| 2006/0083119 A1 | * | 4/2006 | Hayes | 369/30.09 |

* cited by examiner

*Primary Examiner*—Don Wong
*Assistant Examiner*—Thanh-Ha Dang
(74) *Attorney, Agent, or Firm*—Choate, Hall & Stewart, LLP

(57) ABSTRACT

The invention provides a method, system, and computer program product for storing and elaborating user preferences for objects in response to a user's name. The invention associates a user's name with an entitlement expression that includes a reference to at least one membership map having preference information regarding the preference objects and associates with the preference objects a unique identifier that acts as an index into each membership map. The entitlement expression is evaluated for the user's name to determine a list of preferred objects for that user. The evaluation includes looking up the preference object's membership information in at least one membership map of preference using the preference object's unique identifier. The invention may further include at least one preferred group having a name, zero or more objects that are members of the preferred group, and a membership map for determining whether a particular object is a member of the group. The entitlement expression then refers to at least one membership map by including at least one group name in the entitlement expression.

34 Claims, 13 Drawing Sheets

— Prior Art —

— Prior Art —

— Prior Art —

| Object₁ Name | Entitlement Expression₁ |
|---|---|
| Object₂ Name | Entitlement Expression₂ |
| Object₃ Name | Entitlement Expression₃ |
| Object₄ Name | Entitlement Expression₄ |
| Object₅ Name | Entitlement Expression₅ |
| Object₆ Name | Entitlement Expression₆ |
| ⋮ | ⋮ |
| Object_N Name | Entitlement Expression_N |

Figure 4

— Prior Art —

SYSTEM FOR AND METHOD OF STORING AND ELABORATING USER PREFERENCES

This application claims the benefit of U.S. Provisional Application No. 60/270,076, filed on Feb. 20, 2001, and specifically incorporates the contents of that application herein by reference in its entirety.

FIELD OF THE INVENTION

The invention relates generally to a system and method for managing user preferences in a computer system that may be part of a computer network. More particularly, the system and method for storing and elaborating user preferences utilizes data storage maps and indices for determining and categorizing a user's preferences for objects or groups of objects.

BACKGROUND OF THE INVENTION

The size and extent of the Internet's projected use in the years ahead will require that successful e-businesses offer massively scalable solutions to problems such as how to personalize information for individual users. As Internet users become increasingly savvy and require more specialized information services, the complexity of developing both scalable and granular personalization solutions becomes compounded. Unfortunately, current access control technology lacks sufficiently scalable and finely granular personalization solutions.

The future of e-business will require ways to personalize information based upon a user's needs or preferences. Current storage mechanisms are inefficient in gathering and storing such a huge amount of data related to individuals. The market for a solution that addresses problems of customer relationship management in this regard is estimated to grow to $11 billion by 2002. Projections may increase even further if new applications for efficiently stored and categorized user preference information are developed.

The growth in popularity of wireless devices with limited user interfaces will sharpen the need for focused, targeted content, according to quick evaluation of users' preferences.

Information relating to a Web user's activity can be applied to all types of customer relationship models. As new presences on the Web start (and fail) daily, the obvious question remains of how an e-business can focus on those users that make their way through their electronic front door, recognizing its customers and storing information useful with respect to that customer's past activity in visits past. What is needed is a way to efficiently store and retrieve user preferences.

Certain types of individuals can be placed in characteristic groupings. However these groupings are gathered, their use adds considerable value to not only an e-business' knowledge of its customers, but to outsiders like prospective advertisers for which such categorizations often affect decisions on ad revenue placement. So long as there is a means to gather this information, there will be those that profit from its use. What is needed is a way to categorize user preferences into groups.

In addition to indicating the whether a given user prefers an object, there is also the need to identify the full set of objects preferred by an individual.

SUMMARY OF THE INVENTION

The invention described herein provides a platform independent, fast, scalable and standards compliant system for storing and elaborating user preferences. Building upon an entitlement management system, simple expressive representations of complex preference associations are provided in an easy to administer format. The efficient data structures and techniques used result in high performance even with large numbers of preference objects, users and lists and the scalable algorithms and techniques of the system provide built-in support for growth. The invention also provides preference object, object group and object registry builder tools that are easy to set up and allow for ongoing maintenance.

A method according to the invention, applied in a system having a plurality of preference objects that may be preferred by a user, determines a user preference list in response to a user's name. The method includes associating an entitlement expression with the user name, and associating a unique identifier with the preferred object. The entitlement expression includes a reference to at least one membership map having preference information for the preference object, and the preference object's unique identifier acts as an index into the membership maps. The method includes evaluating the entitlement expression for the user name to determine a preference list where the evaluation includes looking up the object's membership information in at least one membership map referred to in the entitlement expression using the object's unique identifier.

The system may further include at least one preferred object group where each group has a name, zero or more objects that are members of the group, and a membership map for determining whether a particular object is a member of the group. The entitlement expression then references at least one membership map by including at least one group name corresponding to a group having a membership map in the entitlement expression. The entitlement expression may also include more than one group name, and may include operators such as boolean operators, for example, for operating on the group names to evaluate an entitlement request. In evaluating the entitlement expression for a preference object, the system uses the object's identifier as an index into membership maps to determine whether the object is a member of a group, then evaluates the expression to determine whether the object meets the entitlement requirements.

In one embodiment, each membership map is a bit map and the preference object's unique identifier is an index to a position in each bit map wherein the bit at that position indicates whether the object is a member of the group corresponding to the bit map. The membership bit maps can be conveniently stored in paged data structures.

The invention also includes a system for determining user preferences having a first means for storing a plurality of preference objects and a unique identifier associated with each preference object and a second means for storing a plurality of unique preference object group names. Each of the plurality of preference object group names has an associated membership map with the object identifier acting as an index into the preference object group membership maps for determining whether a preference object is a member of a preference object group. The system further includes a processor means for determining whether an object is preferred by a user in response to the user's name by evaluating an entitlement expression for the user's name wherein the entitlement expression includes a reference to at least one preference object group. The system may also have a third means for storing at least one unique user name corresponding to a user and an entitlement expression associated with each user's name.

The system may be implemented as a server process responsive to one or more client processes representing user's accessing the system. In one embodiment, the processor means may be implemented as a plurality of threads executing on a server computer for accessing the first and second means and for determining a user's preferences based on information retrieved from the first and second means.

The user preference elaborating system of the invention provides a new approach to storing and determining user preferences in complex systems and provides a dramatic advance over other approaches by providing high speed resolution of dynamic access control rules. The user preference elaborating system thereby enables reliable promotional and advertising targeting without driving readers away by evaluating a user's preferences in real time.

The system also provides support for common distributed object models which allows for easy integration into a wide variety of operating environments. The user preference elaborating system can further be made available as middleware and as webware and can be implemented as an embedded component. In short, the system of the invention can be deployed anywhere that user preferences need to be determined.

BRIEF DESCRIPTION OF THE DRAWING

FIG. 4 is a block diagram illustrating a data structure for an object registry data store.

DETAILED DESCRIPTION OF CERTAIN PREFERRED EMBODIMENTS OF THE INVENTION

Certain embodiments of the invention will now be described with reference to the accompanying figures.

The present invention provides a system and method for gathering and storing user preferences. The present invention represents an alternative use of the access control system described in U.S. Pat. No. 6,154,741 entitled "Entitlement Management and Access Control System," issued Nov. 28, 2000, and assigned to the assignee of the present patent application. That patent is hereinafter referred to as the "Entitlement Patent", and its contents are hereby incorporated by reference in their entirety. FIGS. 1 through 4 in the present application use the unaltered diagrams and terms from the corresponding figures in the "Entitlement Patent" to describe the underlying system, while the introduction of FIGS. 5 through 11 describe the present invention. A description of the access control system of the Entitlement Patent precedes the description of the present novel use of tat system in storing and elaborating user preferences. The present system can advantageously be built upon the structure disclosed in the Entitlement Patent, and the description that follows relies on the entitlement structure, because that structure enables the present user preference elaboration system. The user preference elaboration system can be used for a variety of purposes including, but not limited to, recognizing e-business customers, storing information relevant to those customers, and grouping or categorizing the customers for promotional or advertising purposes.

Figure 1:
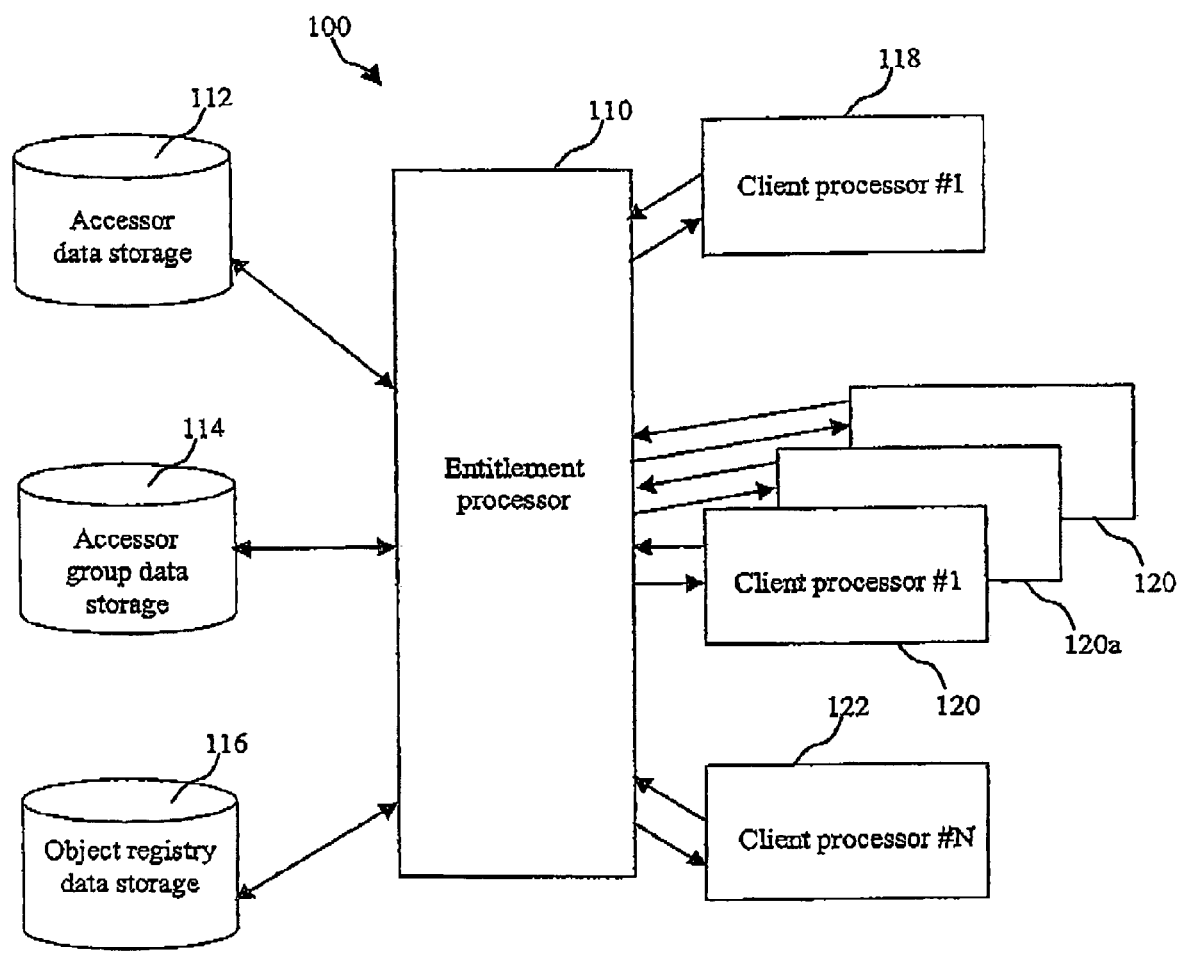
FIG. 1 is a block diagram illustrating an entitlement system.

Referring now to FIG. 1, an exemplary entitlement manager system 100 which provides the underlying structure for the user preference elaborating system includes an entitlement processor 110 which receives data from and provides data to an accessor data storage 112, an accessor group data storage 114 and an object registry data storage 116. As used herein "accessors" are entities which request access to, and are generally entitled to some kind of access to, objects or resources in the system. An "accessor group" refers to a named collection or group of accessors. An "object registry" (OR) includes individual resources, each resource uniquely identified and associated with an "entitlement expression." An "entitlement expression" is a specification of access entitlement and generally includes a reference to at least one accessor group, and may further include a plurality of references to accessor groups and one or more operators which can, for example, be Boolean type operators. In addition, function names can be used as operators, allowing for custom operations to be performed.

Each of the data storage devices 112-116 may be provided, for example, as a database, into which information for arbitrating systems resources is stored. Each of the data storage devices 112-116 may also be combined in a single entitlement database. In addition, accessor data storage 112 can be a specialized database known as a directory service such as LDAP, NDIS, NDS, YP, x.500, etc. The entitlement processor 110 retrieves information as appropriate and provides information to and receives information from a plurality of client processes 118-122. Entitlement processor 110 may also be implemented in a multithreaded manner, and the threads on which it executes may be selected from pools of waiting threads. For example, the entitlement processor 110 may maintain open data base threads to access stores 112-116. Alternatively, entitlement processor 110 can obtain open threads from a pool of threads into one or more databases to access stores 112-116. Entitlement processor 110 may also access the stores 112-116 in a parallel fashion to increase speed.

The accessor data storage 112 contains a listing or other information which describes persons or software applications or objects that can potentially can have access to information or resources available on the system. The accessor group data storage 114 includes lists of named groups which are associated with membership maps. In a manner to be described further in detail below, the named groups are used to specify which accessors have access to which information. There is generally a one-to-one correspondence between each addressable membership information slot in the membership map and each accessor in the accessors data storage.

The object registry data storage 116 includes an object or resource identifier and an entitlement expression (E-expression). The E-expression is evaluated by the entitlement processor to determine which accessors have access to which information and resources. The entitlement expressions can include accessor names and accessor group names. For example, one group name could be all U.S. citizens; this group would include all accessors who are U.S. citizens. A second group name could be "all males under age 25" and this would have a second, different associated membership map. A proper E-expression could be "all U.S. citizens minus all males under age 25." Thus, the result of the E-expression would provide access to particular resources to all U.S. citizens who are not males under the age of 25. The E-expression may also include individual accessor names, such as "all U.S. citizens minus John Smith and Jane Doe."

The entitlement processor 110 executes an entitlement manager process. The entitlement manager process corresponds to one or more execution threads serving entitlement manager requests from other processes. For example, the other processes could correspond to client processes 118, 122 or multi-threaded client processes 120. The client processes 118-122 request entitlement arbitration services from the entitlement manager 100. The entitlement manager process could be executed in a client processor or in any other processor (e.g., as server processor) as long as the entitlement manager process has access to the appropriate data structures 112-116.

Figure 2:
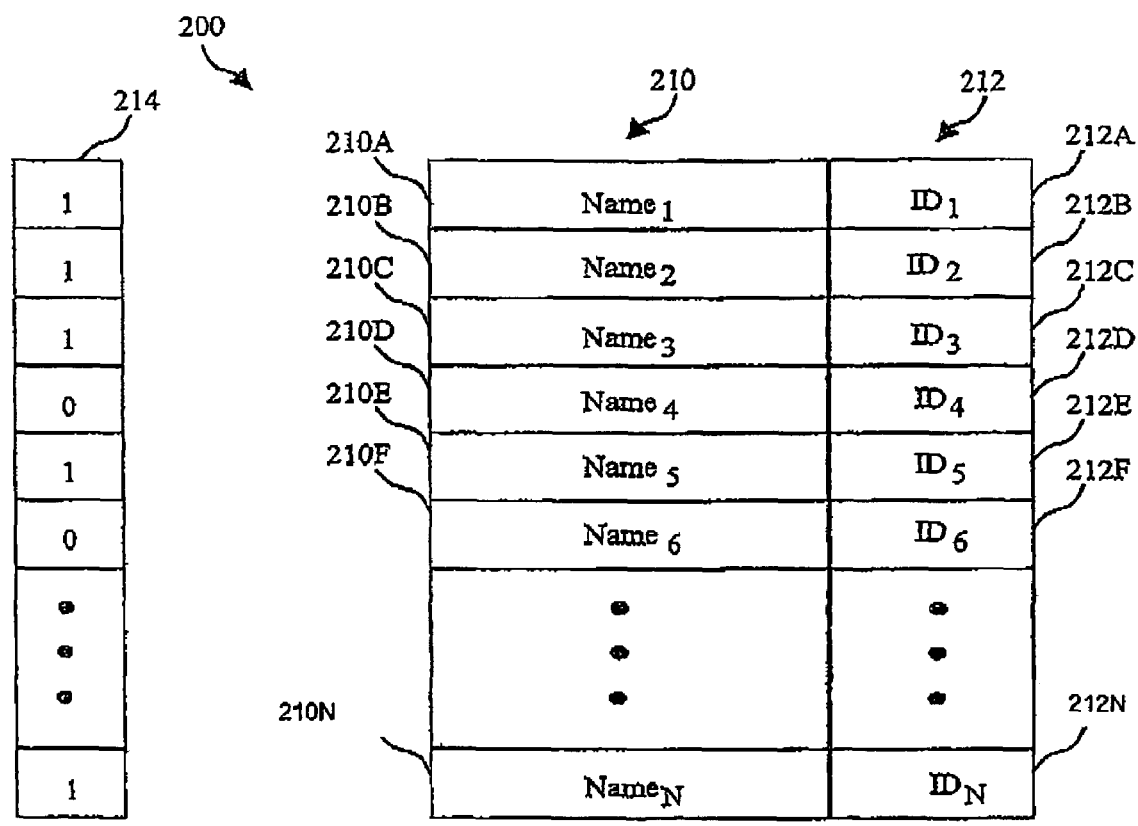
FIG. 2 is a block diagram illustrating a data structure for an accessor data store.
Figure 3:
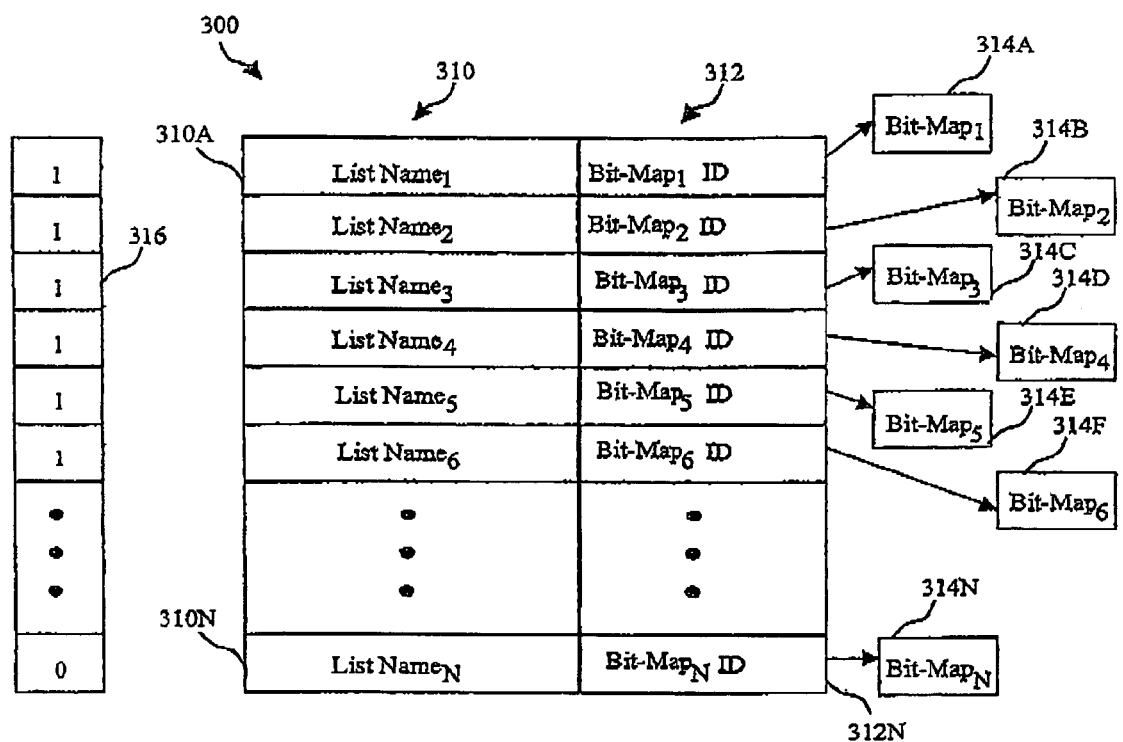
FIG. 3 is a block diagram illustrating a data structure for an accessor group data store.

FIGS. 2-4 illustrate a set of entitlement manager data structures. Those of ordinary skill in the art will appreciate, of course, that other data structures could be used to implement the membership map solution to the user preference problem provided by the present invention.

Referring now to FIG. 2, an accessors data store 200 includes a plurality of accessor names 210 with corresponding identification numbers (ID's) 212. The names 210 are keys into the accessors data store 200 and the ID's 212 are used as indexes into accessor group membership maps. In one embodiment, the system stores an accessor ID availability bit map 214 which is associated with the list of accessors 210. The bit map 214 includes a bit for each available identification number. The bits associated with the identification numbers which are currently assigned to accessors are ones and the bits associated with identification numbers which are not assigned are zeros.

Referring now to FIG. 3, an accessor group data store 300 includes a plurality of accessor group names 310 and the accessor group data store 300 associates those accessor group names 310 with accessor group membership maps 314. In the embodiment shown in FIG. 3, the accessor group data store 300 associates each accessor group name 310 with a membership map identification number (MMID) 312. The list names 310 are keys into the accessor group data store and the MMID's 312 identify or address membership maps 314 that represent whether individual accessors are members of the accessor groups.

A membership map 314 can be any data structure organized so that the membership information for a particular accessor 210 can be addressed by that accessor's accessor ID 212. In one preferred embodiment, the membership map 314 is a bit map having one bit for each accessor 210 in the accessor store 200. For example, if a particular accessor 210 has an accessor ID of, say, 17, the 17'" bit in each membership bit map 314 will be set to one if that accessor is a member of that accessor group. The 17 bit will be set to zero for each membership bit map where the accessor is not a member of the accessor group.

In one embodiment, the system stores an MMID availability bit map 316 which is associated with the list of accessor group names 310. The bit map 316 includes a bit for each available membership map identification number. The bits associated with membership map identification numbers which are currently assigned to accessor group names are ones. The bits associated with bit map identification numbers which are not assigned are zeros. The MMID availability bit map can be used to assign the first available MMID to a new accessor groups as needed.

Referring now to FIG. 4, an object registry data store 400 includes a plurality of object names 410 and a corresponding plurality of entitlement expressions 412 which describe the entitlement access to the associated object or resource. The object names 410 are keys into the object registry data store.

The information stored in a single bit map is divided into several pages to increase the speed of the system. The system stores a predetermined number of bits on each page. When determining whether a particular bit is set to "one," the system goes directly to the page including that particular bit. This process is more efficient than starting at the first bit and indexing through all the bits until the desired bit is located. In one embodiment, the system also identifies whether the bits on a particular page are all zeros, all ones or are a combination of zeros and ones. In this embodiment, the system only needs to evaluate a particular bit when the page indicates it contains mixed values.

The operation of the entitlement manager system 100 is next described by reference to FIGS. 1 to 4. Entitlement verification requests arrive at the entitlement manager 100 server process in response to client processes 118-122 wishing to access resources. An entitlement verification request generally includes two identifiers: an accessor name or identification representing the identity of the accessor who wishes access to a resource; and an object name or ID representing the identity of the resource that the accessor wishes to access. The entitlement manager 100 queries the accessors table 200 using the requesting accessor's name 210 to determine the accessor's ID 212. The accessor's ID 212 is then used as an index into a bit position in the accessor group membership bit maps 314.

In an exemplary embodiment, each bit map 314 includes a number of bit fields that is at least as great as the number of names 210 in the accessors table 200. The accessor's ID 212 may then be a number that represents the position of that Accessor's bit in each bit map 314. An example is provided in Table 1. If an accessor who queries the system is identified in the accessors table 200 as having an ID 212 value of 3, that ID value acts as an index into the list name bit maps 314 as the third bit in each bit map.

For the example, and making reference to Table 1, an accessor having an ID of 3 is identified as belonging to the lists of "All Subscribers," "US Subscribers," and "Male." The accessor having an ID of 3 does not belong to the lists "Physical Therapists," "Medical Doctors," "Female," or "Gender Unknown."

TABLE 1

| List Name \ID Number | 1 | 2 | 3 | 4 | 5 |
|---|---|---|---|---|---|
| All Subscribers | 1 | 1 | 1 | 1 | 1 |
| Physical Therapists | 0 | 0 | 0 | 1 | 0 |
| US Subscribers | 1 | 1 | 1 | 1 | 0 |
| Medical Doctors | 1 | 0 | 0 | 0 | 1 |
| Male | 1 | 0 | 1 | 0 | 0 |
| Female | 0 | 1 | 0 | 1 | 0 |
| Gender Unknown | 0 | 0 | 0 | 0 | 1 |

The object registry 400 is queried using the object name 410 to retrieve that object's E-expression 412. The E-expression is parsed, or is stored in a pre-parsed form, and evaluated to yield a final bit value for the accessor. The E-expression may include accessor group names 310 that are allowed or not allowed access to particular resources. Continuing with the example described by reference to Table 1, the resources may be World Wide Web pages and members of different groups identified by the list names 310 may be allowed access to certain Web pages and not allowed access to other Web pages.

An example object registry 400 is provided in Table 2.

TABLE 2

| Object Name | E-expression |
|---|---|
| Web Page 1 | All Subscribers |
| Web Page 2 | All Subscribers but not Physical Therapists |
| Web Page 3 | All subscribers but not US Subscribers |
| Web Page 4 | Medical Doctors |

Operating on the accessor's bit value in each accessor group specified in the E-expression, and then combining the individual values according to the operators in the E-expression yields a final adjudication of the validity of the requested access. If our example accessor having an accessor ID 212 of 3 tries to access the resource having the object name 310 "Web Page 3," entitlement processor 110 first checks the accessor's "All Subscribers" bit map for the value of bit 3 and finds that the accessor is a member of this group. The entitlement processor 110 also checks the "US Subscribers" bit map for the value of bit 3 and finds that the accessor is a member of this group and denies access to Web Page 3 to this accessor based on the "not" operator in the E-expression.

Where the E-expression includes more than one accessor name or accessor group name, the E-expression can include operators that act to combine the names. Exemplary operators can include Boolean operators, however, any useful operator for combining Accessors or groups of accessors may be defined in the system of the invention by a person of ordinary skill in the art.

The system of the invention advantageously allows E-expressions to be stored in a way that is readily readable and usable by system operators. Accordingly, E-expressions need not always be stored in an object registry, but can be associated with objects at run time by prompting a system operator enter an E-expression, for example by way of an E-expression entry GUI, at some appropriate time when an E-expression is needed to define entitlement to an object.

Figure 5:
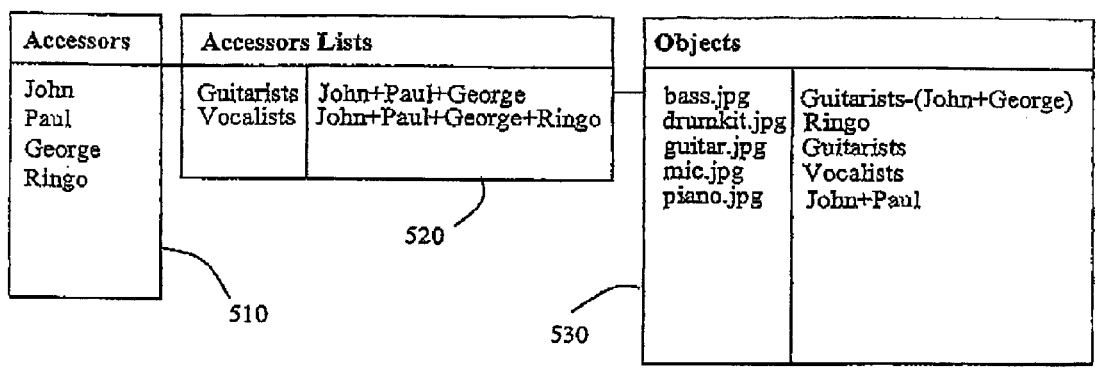
FIG. 5 is a block diagram illustrating a structure for data stores interrelation in a user-centric model.

Referring to FIG. 5, a block diagram illustrates a structure for data stores interrelation in a user-centric model. FIG. 5 includes accessor store 510, accessor list store 520, and object store 530. In operation, entries from accessor store 510 can stand alone as identified users for entitlement, and can also be added as members of groups to accessors list store 520. Object store 530 contains a list of objects (in the case of the above example, "jpeg" picture files) associated with entitlement expressions (e-expressions). Each e-expression is evaluated by programming functions to itemize which accessors or groups of accessors are entitled to the corresponding object. For further description of the operation relevant to this structural representation, refer to the "Entitlement Patent."

Figure 6:
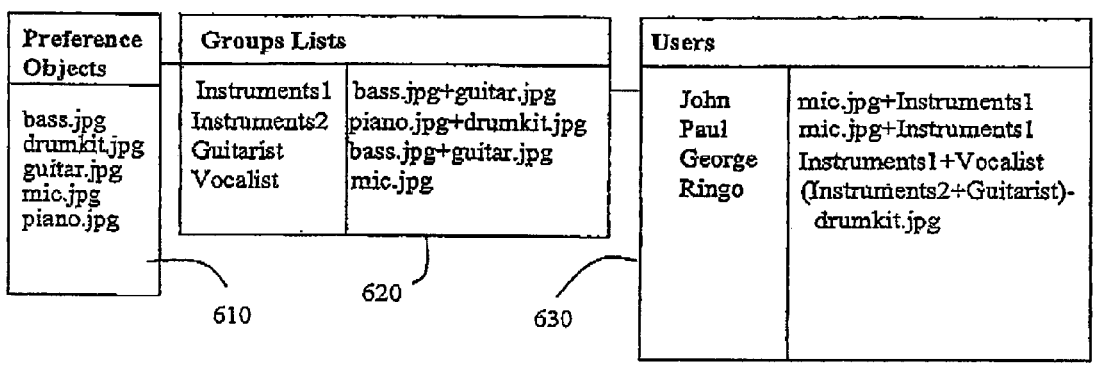
FIG. 6 is a block diagram illustrating a structure for data store interrelation in an object-centric model.

Referring to FIG. 6, a block diagram illustrates an alternative structure, employed by a user preference elaborating system in accordance with the present invention, for data stores interrelation in an object-centric model. FIG. 6 includes preference objects store 610, groups lists store 620, and users store 630. In operation, entries from preference objects store 610 may stand alone or be added in groups to groups lists store 620. Users store 630 contains a list of users and e-expressions that itemize which objects or groups of objects are associated with each user. FIG. 6, in effect, represents a functional reversal of the entitlement engine, while continuing to utilize its inherent structure.

FIGS. 7 through 10 are a series of flow diagrams showing data maintenance processing performed by a processing apparatus which may, for example, be provided as part of the entitlement processor system such as that shown in FIG. 1, to allow storage and elaboration of user preferences within a system. The rectangular elements in the flow diagram(s) are herein denoted "processing blocks" and represent computer software instructions or groups of instructions. The diamond shaped elements in the flow diagrams are herein denoted "decision blocks" and represent computer software instructions or groups of instructions which affect the processing of the processing blocks.

Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrates the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

Figure 7:
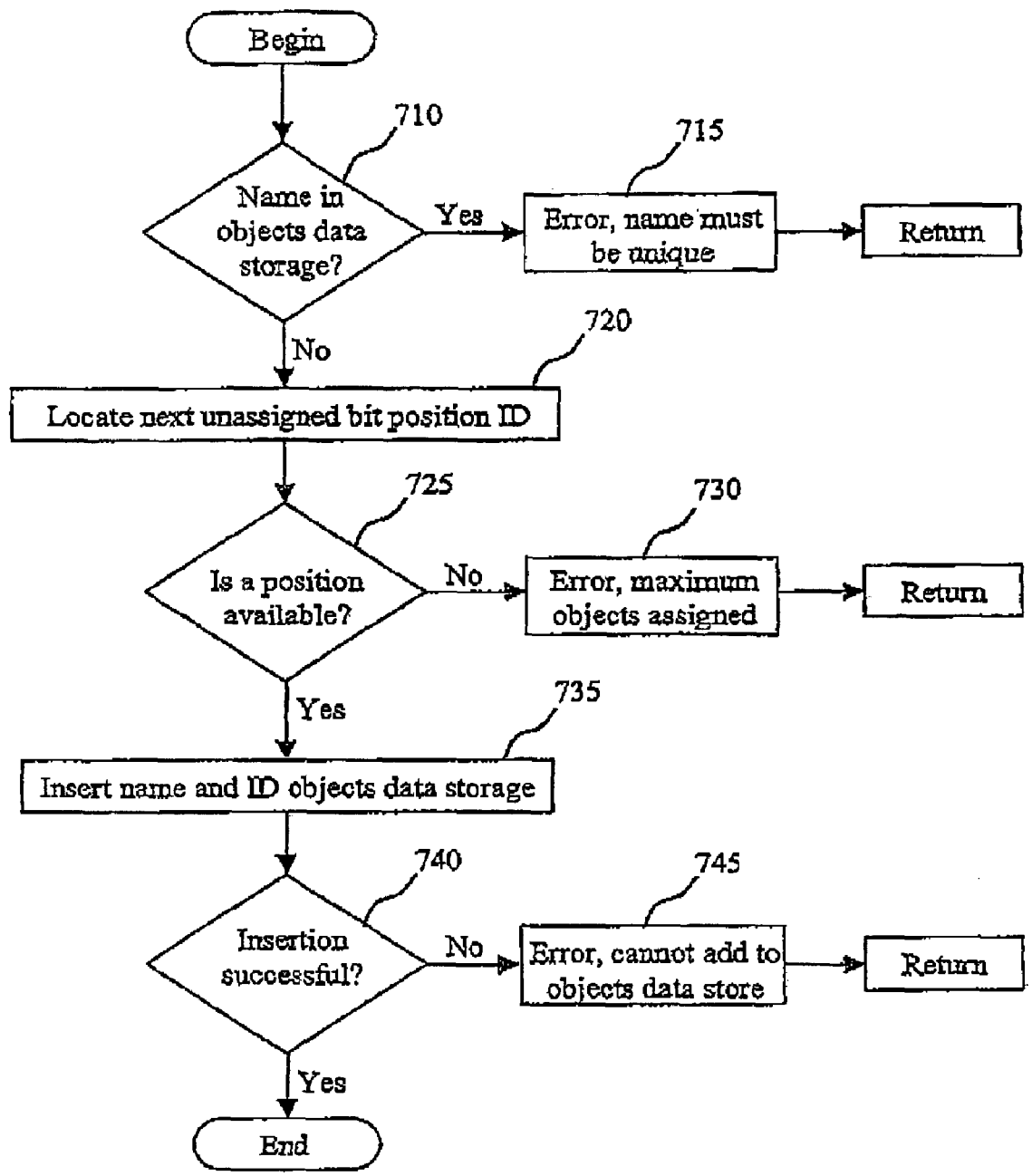
FIG. 7 is a flow diagram illustrating a method of adding an preference object to preference objects data storage.

A procedure for adding new preference objects to preference objects data store 610, as illustrated in FIG. 7, begins in step 710 where a determination is made as to whether a preference object in preference objects data storage already exists. If the name already exists, then processing flows to block 715 where an error signal/condition is generated since each preference object must be unique. Processing then ends or returns to the start. If in step 715 a decision is made that the name is not already in the preference objects data storage, then processing flows to block 720 where the next unassigned preference object ID is located.

In order to determine which identification number should be assigned to a new preference object, the system keeps track of which identification numbers are currently assigned to preference objects. The user preference elaborating system stores a bit map that is associated with the preference objects. The bit map includes a bit for each available identification number. The bits associated with the identification numbers which are currently assigned to preference objects are ones and the bits associated with identification numbers which are not assigned are zeros. The system begins at the bit associated with the first identification number and searches for the first bit that is a zero. In one embodiment, the identification number of an entity that was once a preference object, but which is no longer a preference object, may be reassigned. In this embodiment, when an entity is removed from the list of preference objects, the bit in the bit map associated with that entity is changed to a zero. When the system searches for the first identification number which is not assigned to a preference object, this zero bit identifies the removed preference object's identification number as being available.

In step 725, if a bit map position or ID number is not available, then the processing flows to step 730 where an error signal/indicator is generated because the maximum number of preference objects has been assigned. If in step 725 a decision is made that a position is available, then the object name and identifier are inserted into the preference objects data storage, as shown in step 735. Processing then flows to step 740 where a determination is made as to whether the insertion was successful. If a decision is made that the insertion was not successful, then processing flows to step 745 where an error/condition signal is generated to indicate that the object names cannot be added to the preference objects data store. Finally, if in step 740 the decision is made that the insertion was successful, then processing ends.

Figure 8:
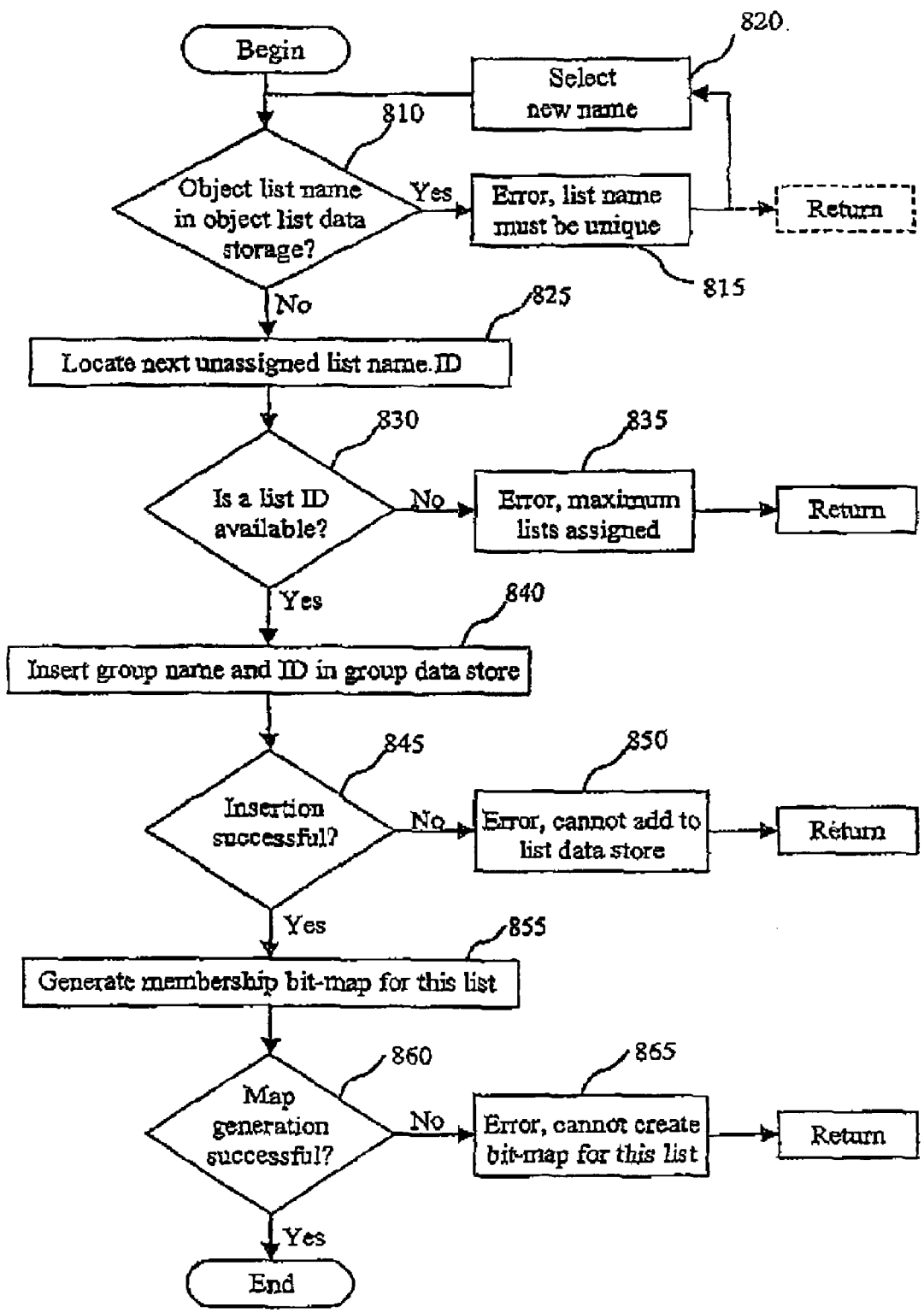
FIG. 8 is a flow diagram illustrating a method of adding an object group to groups lists data storage.

Referring now to FIG. 8, object group maintenance processing for adding an object group to groups lists data storage begins in step 810, where a determination is made as to whether an object group name already exists in object group data storage. If the object group name does exist, then processing flows to step 815 where an error signal or condition is generated since each object group name must be unique. Processing then proceeds to step 820 where a new objects group name is selected. This loop is repeated until a new objects group name is selected. Once a new objects group name is selected, processing proceeds to step 825 where a next unassigned groups list name and ID are located. In step 830, a determination is made as to whether an object group membership map identification is available. If no identification is available, then processing proceeds to step 835 where an error signal or condition is generated due to the maximum groups lists already being assigned. Processing then ends or returns.

Similar to the process of assigning identification numbers to new objects, the user preference elaborating system keeps track of which membership map identification numbers are currently assigned to object group names. As mentioned above, in one embodiment, the system stores a bit map that is associated with the list of object group names. The bit map includes a bit for each available bit map identification number. The bits associated with bit map identification numbers that are currently assigned to object group names are ones. The bits associated with bit map identification numbers that are not assigned are zeros. The system begins at the bit associated with the first bit map identification number and searches for the first bit that is a zero. In one embodiment, the bit map identification number of an object group name that has been removed from the system may be reassigned. In this embodiment, when an object group name is removed, the bit in the bit map associated with that object group name's identification number is changed to a zero. When the system searches for the first bit map identification number which is not assigned to an object group name, this zero bit identifies the removed object group name's bit map identification number as being available.

If a membership map ID is available, then processing flows to step 840 where the object group name and membership map are inserted into an object group data store. Processing then flows to step 845 where a determination is made as to whether the insertion was successful. If the insertion was not successful, then processing flows to step 850 where an error signal/condition is generated due to the inability to add to the object group data store. Processing then ends or returns as shown. If the insertion is successful, then processing flows to step 855 where a membership map for this list is generated. Processing then flows to step 860 where a determination is made as to whether the membership map generation was successful. If the map generation was successful, then processing ends. If the map generation was not successful, then processing flows to step 865 where an error signal/condition is generated to indicate that a bit map for this list cannot be generated. Processing then ends as shown.

Figure 9:
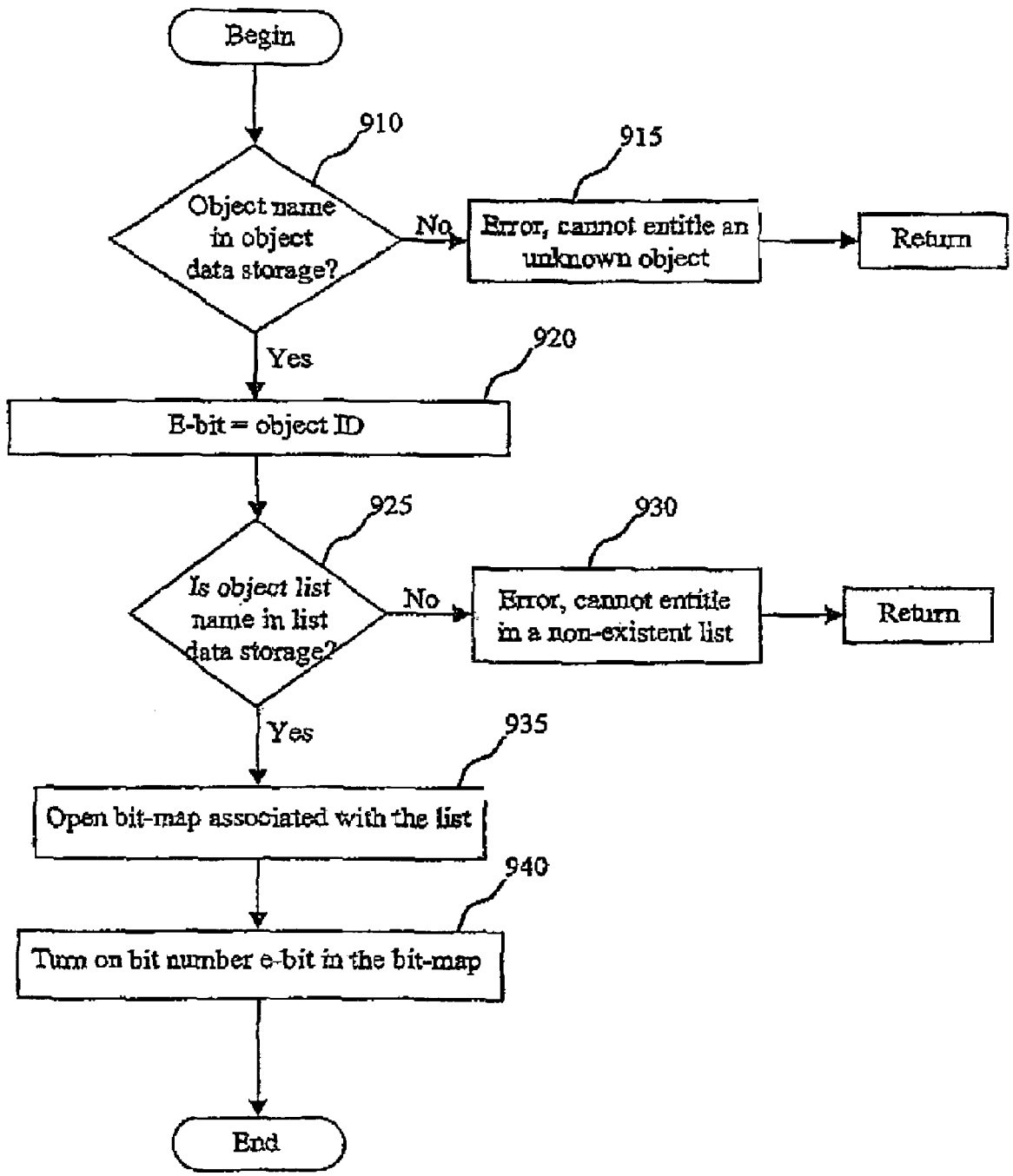
FIG. 9 is a diagram illustrating a method of adding an object to an object group.

FIG. 9 is a block diagram illustrating a method of adding an object to an object group. It should be noted that the input parameters for the entitlement manager process flow includes the object name and the object group name. In step 910, it is determined whether an object name is in the object data storage. If the object's name is not in the object data storage, then processing flows to step 915 where an error signal/condition is generated indicating that an entitlement cannot be given for an unknown object. If in step 910 the decision is made that the object name is in the object data storage, then processing flows to step 920 where an ebit is set equal to the object identifier. Processing then flows to step 925 where the decision is made as to whether the object group name is in the object list data storage.

If a decision is made that the group name is not in the data storage, then processing flows to step 930 where an error signal/condition is generated indicating that entitlement cannot be given to a nonexistent list. If, on the other hand, the object group name is in the object group data storage, then processing flows to step 935 where a bit map associated with the object group is opened or accessed. Then in step 940, the appropriate bit number corresponding to the object's ID in the bit map is set to a predetermined value. Processing then ends.

Figure 10:
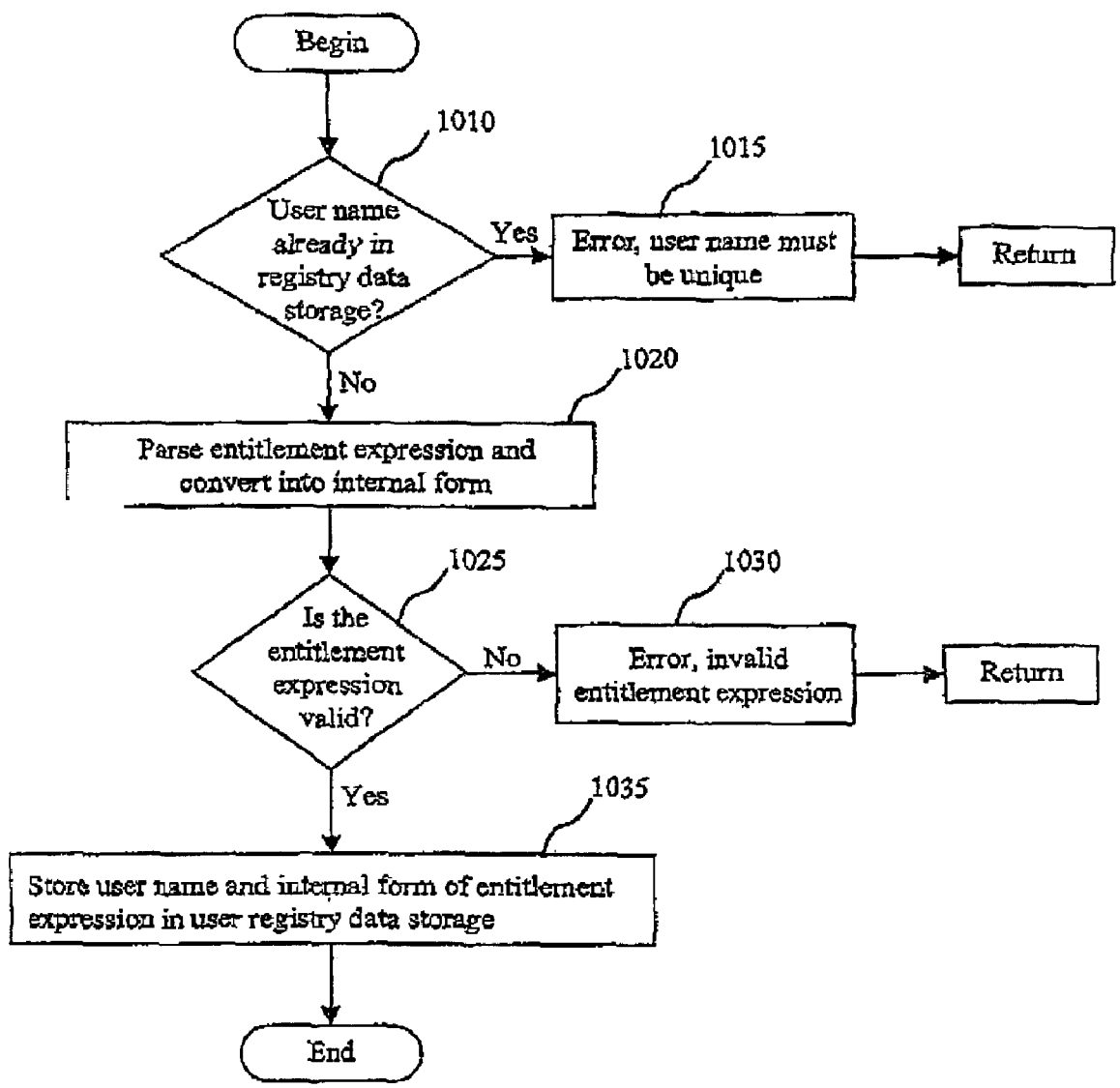
FIG. 10 is a flow diagram illustrating a method of adding a user to user registry data storage.

FIG. 10 is a diagram illustrating a method of adding a user to user registry data storage. Before describing the process flow, it should be noted that the input parameters for the process flow include the user name and an e-expression.

In step 1010, a decision is made as to whether a particular user name is already in the user registry data storage. If the particular name is already in the storage, then processing flows to step 1015 where an error signal/condition is generated since the user name must be unique.

If, on the other hand, it is determined that the user name is not already in the user registry data storage, then processing flows to step 1020 where the entitlement expression may be parsed and converted into a particular internal form. Processing then flows to step 1025 where a determination is made as to whether the entitlement expression is valid. If it is found that the entitlement expression is not valid, then processing flows to step 1030 where an error signal/condition is generated to indicate that an invalid entitlement expression has been provided. If, on the other hand, in step 1025 determination is made that the entitlement expression is valid, then processing flows to step 1035 where the user name and the internal form of the entitlement expression are stored in the user registry data storage. Processing then ends as shown.

Figure 11:
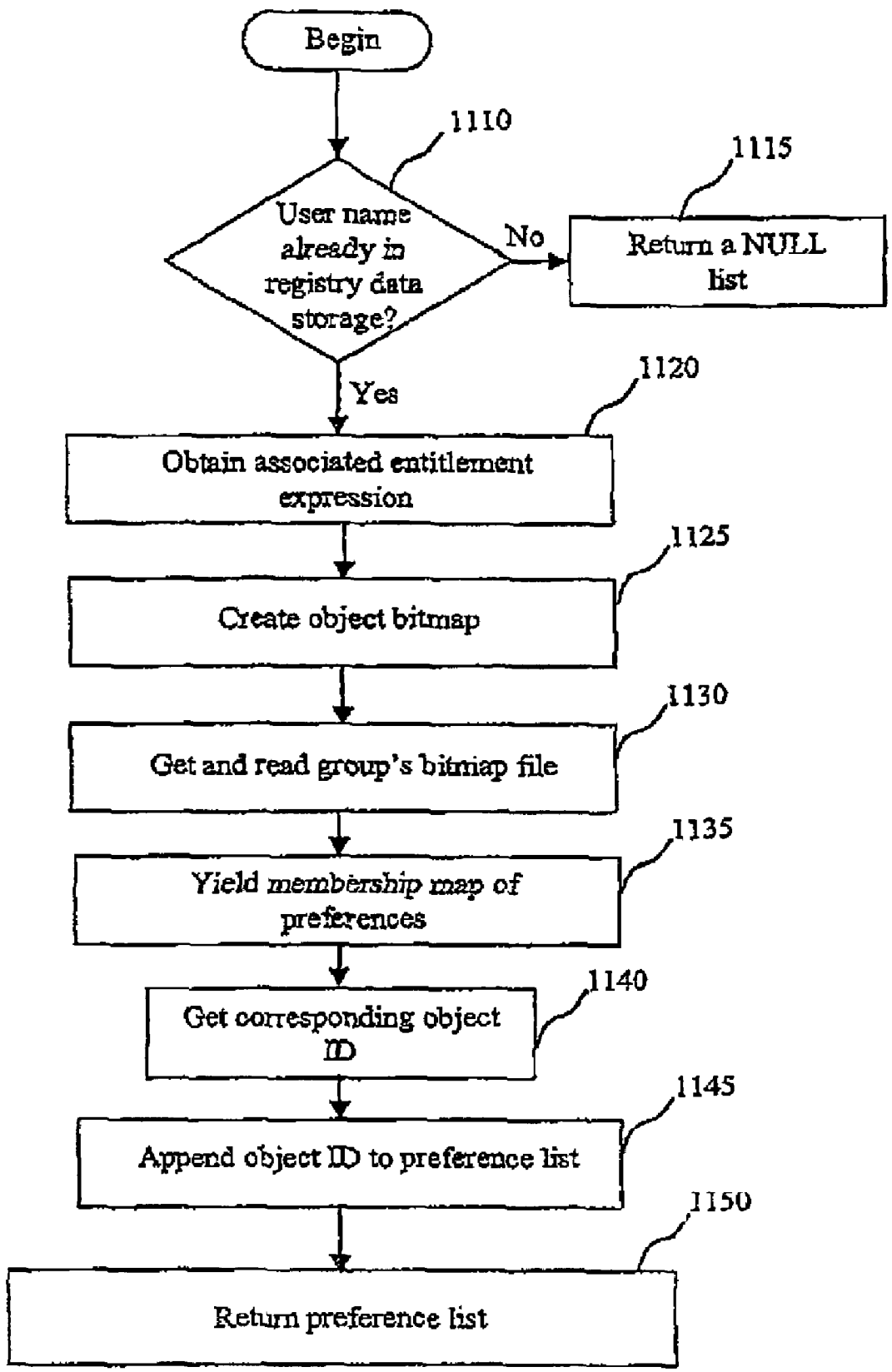
FIG. 11 is a flow diagram illustrating a method of elaborating the set of a user's preferences.

FIG. 11 is a diagram illustrating a method of elaborating the set of a user's preferences. The input for the process flow is a user name. Before describing the process flow, it should be noted that the input parameters for the process flow is the user name.

In step 1110, it is determined whether a particular user name already exists in the user registry data storage. If the answer is "no", then processing flows to step 1115, generating a NULL list since the user name must exist.

If the answer is "yes", then processing flows to step 1120, obtaining the associated entitlement expression. In step 1125, a bitmap entry is created for the object (in the form of all zeroes except '1' for the Object Location). In step 1130, the group's bitmap file is retrieved and read. In step 1135, using the associated entitlement expression, the appropriate bitmap operations are applied, which will yield a membership map of preferences. In step 1140, each "on" bit is retrieved from the bitmap. In step 1145, each "on" bit object is appended to the preference list to create a resulting membership map of preferences. Finally in step 1150, the preference list is returned. This list can be an array of preference objects or an enumeration of preference objects, and the objects can take the form of either object IDs or names. Upon receipt of this list, processing ends.

Figure 12:
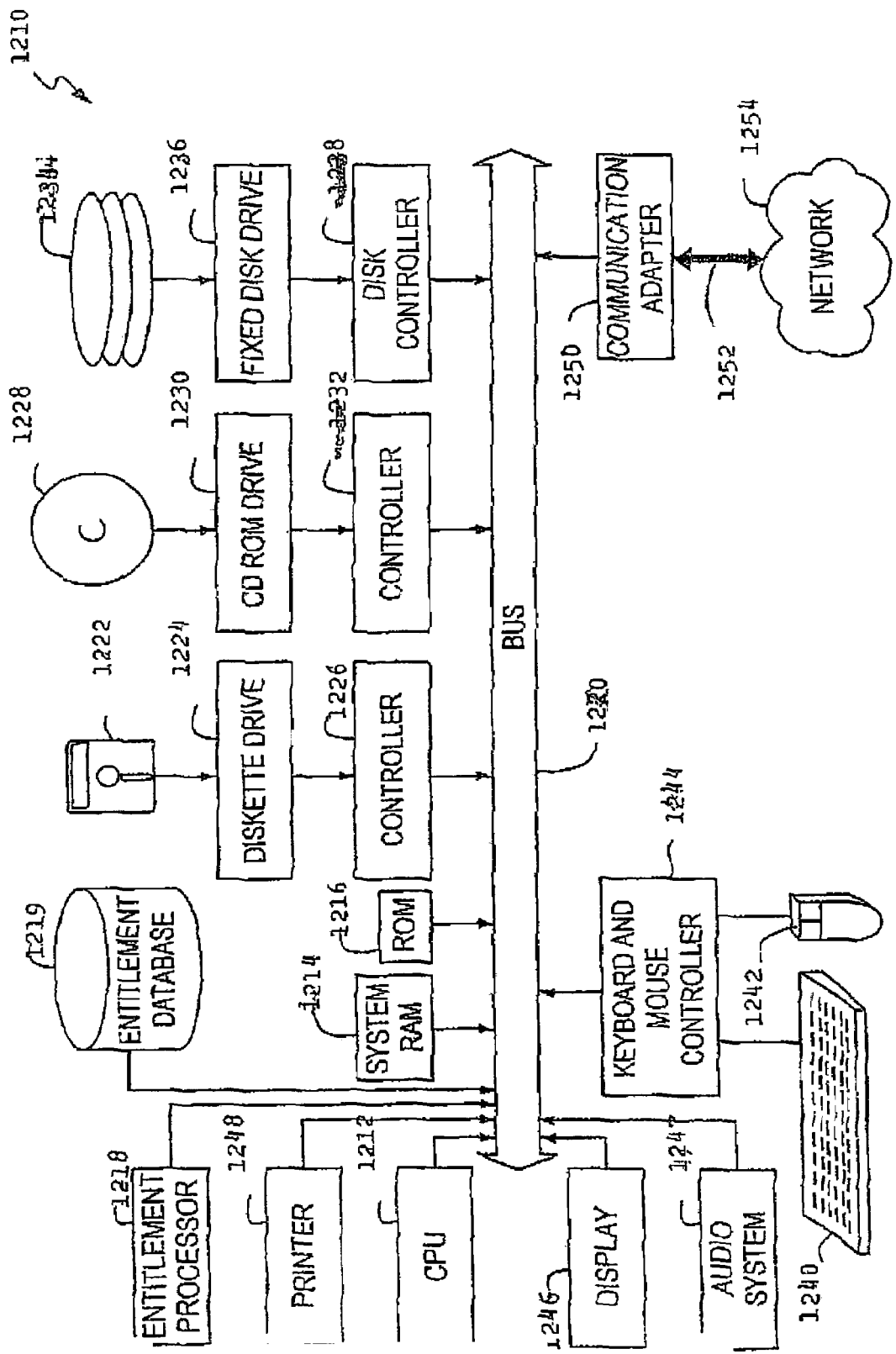
FIG. 12 is an illustration of a computer system on which the invention may be implemented and utilized.

Referring now to FIG. 12, a computer system 1210 on which the invention may be implemented is shown. Computer system 1210 may be provided, for example, as a work station, an IBM compatible computer or any other equivalent computer system. The exemplary computer system 1210 of FIG. 12 is for descriptive purposes only. Although the description may refer to terms commonly used in describing particular computer systems, the description and concepts equally apply to other processing systems, including systems having architectures dissimilar to that shown in FIG. 12.

Computer system 1210 includes a central processing unit (CPU) 1212, which may be provided, for example, as a conventional microprocessor, a random access memory (RAM) 1214 for temporary storage of information, and a read only memory (ROM) 1216 for permanent storage of information. Computer system 1210 may also include a display 1246, an audio system 1247 and an entitlement processor 1218. Each of the aforementioned components are coupled to a bus 1220. Operation of computer system 1210 is generally controlled and coordinated by operating system software. The operating system controls allocation of system resources and performs tasks such as processing, scheduling, memory management, networking, and I/O services, among things. Thus, an operating system resident in system memory and executed by CPU 1212 coordinates the operation of the other elements of computer system 1210.

Also coupled to bus 1220 is a non-volatile mass storage device which may be provided as a diskette 1222. Diskette 1222 is insertable into a diskette drive 1224 which is, in turn, coupled to bus 1220 by a controller 1226. Similarly, a compact disc (CD) ROM 1228 is insertable into a CD ROM drive 1230 which is, in turn, coupled to bus 1220 by a controller 1232. A hard disk 1234 is typically provided as part of a fixed disk drive 1236 which is coupled to bus 1220 by a disk controller 1238.

Data and software may be provided to and extracted from computer system 1210 via removable storage media such as diskette 1222 and CD ROM 1228. For example, values and expressions generated using techniques described above in conjunction with FIGS. 7 through 10 may be stored on storage media similar to media 1222, 1228. The data values may then be retrieved from the media 1222, 1228 by CPU 1212 and utilized by CPU 1212 to perform color printing of scanned or stored mixed color documents. Alternatively, CPU 1212 may simply store such data values in ROM 1216.

Alternatively still, computer software may be stored on storage media similar to media 1222, 1228. Such computer software may be retrieved from media 1222, 1228 for immediate execution by CPU 1212 or by other processors included in one or more peripherals of computer system 1210 such as display 1246 or audio system 1247. CPU 1212 may retrieve the computer software and subsequently store the software in RAM 1214 or ROM 1216 for later execution.

User input to computer system 1210 may be provided by a number of devices. For example, a keyboard 1240 and a mouse 1242 are coupled to bus 1220 by a controller 1244.

Computer system 1210 also includes a communications adapter 1250 which allows the system to be interconnected to a local area network (LAN) or a wide area network (WAN), schematically illustrated by bus 1252 and network 1254. Thus, data and computer program software can be transferred to and from computer system 1210 via adapter 1250, bus 1252 and network 1254.

An entitlement/user preference processor 1218 of the invention may be provided in a computer system by implementing the logic of the entitlement/user preference processor in a special purpose processor or application specific integrated circuit (ASIC) that communicates with CPU 1212 and data storage units 1222, 1228 and 1234 and network 1254 generally as shown in FIG. 12. Alternatively, entitlement processor 1218 may be implemented in software stored on system 1210 as described above and executed by CPU 1212. Entitlement/user preference database 1219 may be placed in communication with system 1210 directly through the system bus 1220 as illustrated, it may communicate with system 1210 through network 1254, or entitlement/user preference database 1219 data may be stored directly onto data storage units 1222, 1228 and 1234 and accessed by CPU 1212 or entitlement/user preference processor 1218 as required.

Figure 13:
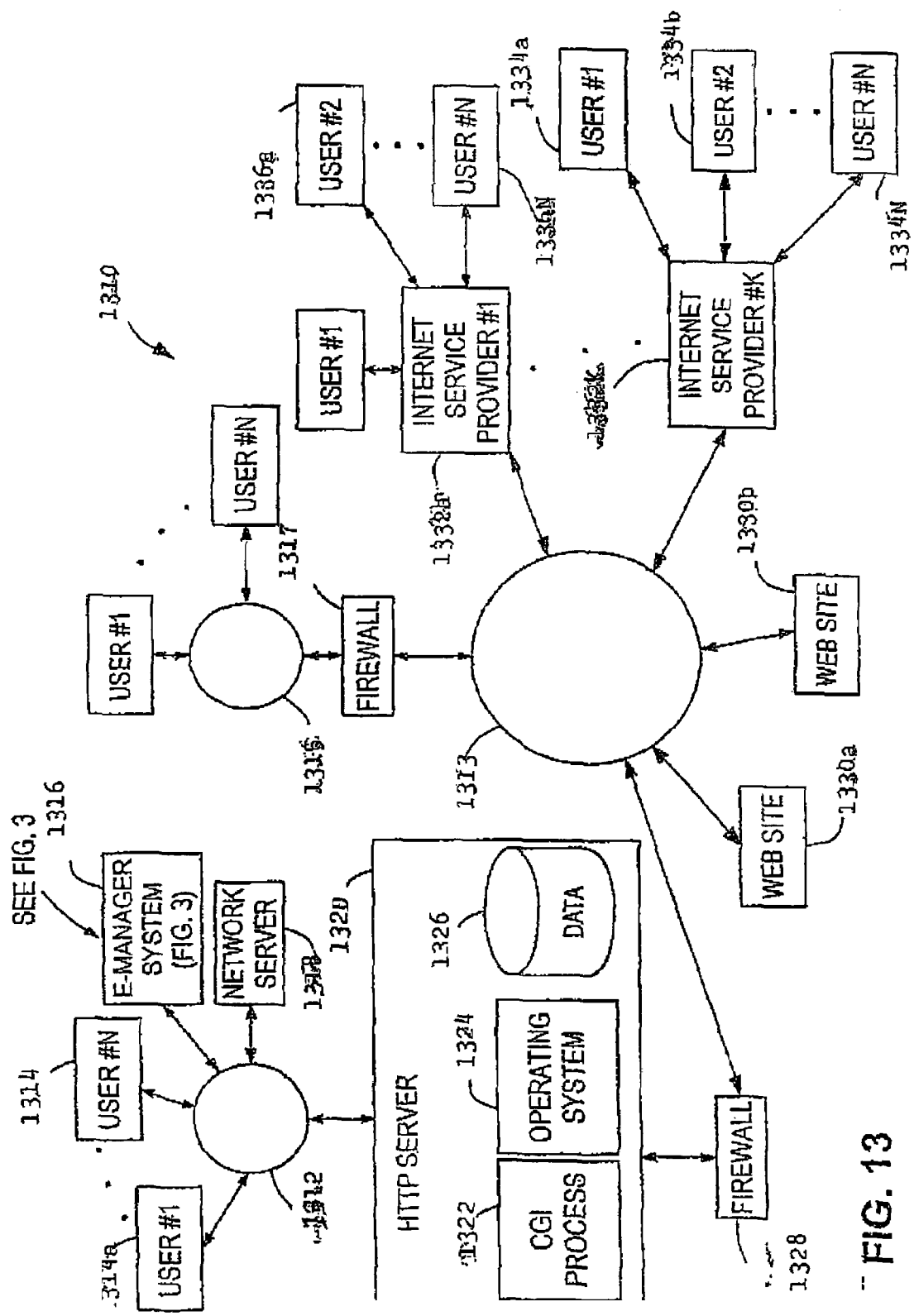
FIG. 13 is a block diagram of a system in which the user preference elaborating system of the present invention can be utilized.

Referring now to FIG. 13, an exemplary network, or more particularly, Internet apparatus 1310 for providing a user preference elaborating system 1316 of the invention will now be described. One or more of a plurality of remote user terminals 1334*a*-1334N and 1336*a*-1336N generally denoted 1334, 1336 may access a local computer network 1312 by connecting the remote user's computer terminal 1334, 1336 to a computer network such as the Internet 1313. As used herein, the term "internet" generally refers to any collection of distinct networks working together to appear as a single network to a remote user. The term "Internet" on the other hand, refers to the so-called world wide "network of networks" that are connected to each other using the Internet protocol (IP) and other similar protocols. The Internet provides file transfer, remote log in, electronic mail, news and other services.

A remote user may connect a remote user terminal 1334, 1336 to the Internet 1313 in a variety of manners known in the art. A common method of making such a connection involves allowing the remote computer 1334, 1336 to communicate with an Internet Service Provider ("ISP") 1332 over telephone or other communication lines using a modem. The remote user then accesses services available on the Internet 1313 through the ISP's Internet communication facilities. Alternatively, users may be coupled to the Internet 1313 via a local area network 1315 and a firewall 1317.

A local computer network 1312 is also connected to the Internet through a firewall 1328 in one of the variety of manners known in the art. The local computer network 1312 includes at least one server computer such as a Hypertext Transfer Protocol (HTTP) server 1320 and a network server 1318. HTTP server 1320 and network server 1318 are coupled via network 1312. HTTP is a network protocol used for transmission of files and other data on the World Wide Web. Thus, HTTP servers are commonly referred to as Web servers.

Remote users may communicate with the HTTP server 1320 using a software application known in the art as a Web browser. A Web browser and Web server have a client-server type relationship. More specifically, a Web browser is an HTTP client which sends requests to an HTTP server. The HTTP server responds to the requests by transmitting to the HTTP client resources identified by the request. Resources may be located on the Internet 1313 using a Uniform Resource Locator ("URL"). Use of URL's is common in the art.

Resources that may be addressed over the Internet 1313 include Hypertext Markup Language ("HTML") files. HTML is a document description language that defines the various components of a World Wide Web page. World Wide Web pages often include text and graphics as well as "links" which allow a viewer of the page to address other resources on the Internet including other HTML pages.

Resources that may be addressed over the Internet 1313 also include software application programs. The Common Gateway Interface (CGI) is one standard for interfacing external software applications with information servers such as HTTP servers. A CGI program may be written in any programming language that may be executed on the computer network 1312. Suitable programming languages include C/C++, Fortran, PERL, TCL, any Unix shell, Visual Basic or Java.

The exemplary HTTP server 1320 executes one or more CGI programs 1322 resident therein. The CGI programs 1322 may be executed on an HTTP server 1320, or on a separate computer connected to HTTP server 1322 such as network server 1318. The CGI programs may access an operating system 1324 in order, for example, to access variables relating to the computing environment in which the CGI programs 1322 are executed.

Figure 13A:
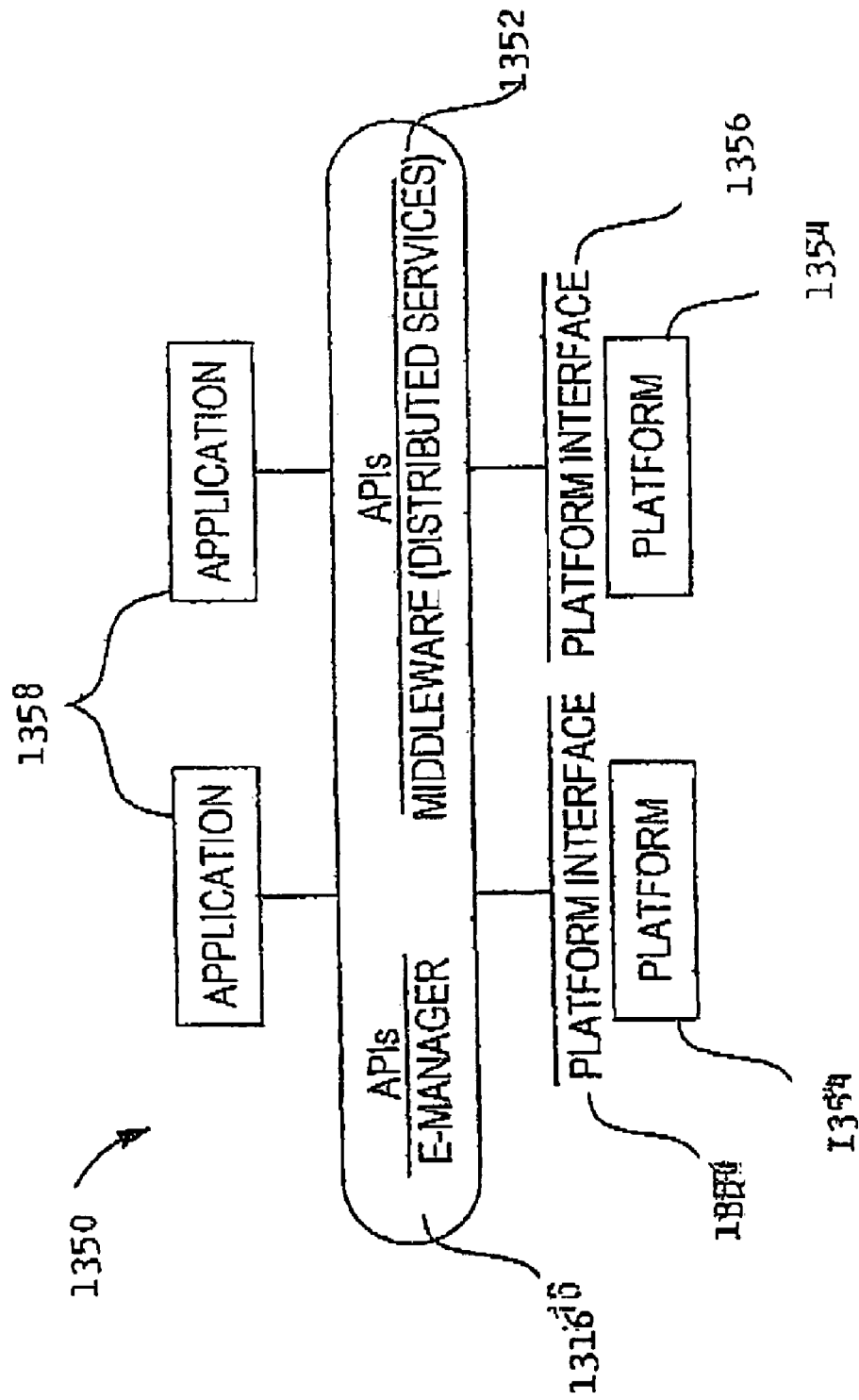
FIG. 13A is a block diagram of an additional system in which the user preference elaborating system of the present invention can be utilized.

Before proceeding with a discussion of FIG. 13A, certain terminology is explained. The user preference elaborating system of the invention may be implemented using "object-oriented" computer programming techniques. Object-oriented computer programming techniques involve the definition, creation, use and destruction of software entities referred to as "objects." Each object is an independent software entity comprised of data generally referred to as "attributes" and software routines generally referred to as "member functions" or "methods" or "logic" which manipulate the data.

One characteristic of an object is that only methods of that object can change the data contained in the object. The term "encapsulation" describes the concept of packaging the data and methods together in an object. Objects are thus said to encapsulate or hide the data and methods included as part of the object. Encapsulation protects an object's data from arbitrary and unintended use by other objects and therefore protects an object's data from corruption.

To write an object-oriented computer program, a computer programmer writes computer code that implements a pre-defined model of the system. The object-oriented computer code defines a set of "object classes" or more simply "classes." Each of these classes serves as a template which defines a data structure for holding the attributes and program instructions which perform the method of an object. Each class also includes a means for instantiating or creating an object from the class template. The means for creating is a method referred to as a "constructor." Similarly, each class also includes a means for destroying an object once it has been instantiated. The means for destroying is a method referred to as a "destructor."

When a processor of a computer executes an object-oriented computer program, the processor generates objects from the class information using the constructor methods. During program execution, one object is constructed, which object may then construct other objects which may, in turn, construct other objects. Thus, a collection of objects which are constructed from one or more classes form the executing computer program.

Object-oriented computer programming techniques allow computer programs to be constructed of objects that have a specified behavior. Several different objects can be combined in a particular manner to construct a computer program which performs a particular function or provides a particular result. Each of the objects can be built out of other objects that, in turn, can be built out of other objects. This resembles complex machinery being built out of assemblies, subassemblies and so on.

The term "client object," or more simply "client," refers to any object that uses the resources of another object which is typically referred to as the "server object" or "server." In one embodiment, the user preference elaborating system of the invention can be implemented as one or more server objects which can be accessed by client objects seeking user preference information by the invocation of one or more user preference manager methods. In addition, objects and some other software applications can communicate using a "publish/subscribe" protocol where an object publishes information, sometimes called an "event," that is received by all other objects that subscribe to that event. The user preference elaborating system can control the broadcast of events by determining which users should receive the "event" publication.

The term "framework" can refer to a collection of inter-related classes that can provide a set of services (e.g., services for network communication) for a particular type of application program. Alternatively, a framework can refer to a set of interrelated classes that provide a set of services for a wide variety of application programs (e.g., foundation class libraries for providing a graphical user interface for a Windows system).

A framework thus provides a plurality of individual classes and mechanisms which clients can use or adapt. In one embodiment, the system of the invention is supplied as a framework that can be tailored to the access control needs of a particular system.

An application framework refers to a set of classes which are typically compiled, linked and loaded with one particular application program and which are used by the particular application program to implement certain functions in the particular application program. A system framework, on the other hand, is provided as part of a computer operating system program. Thus, a system framework is not compiled, linked and loaded with one particular application program. Rather, a system framework provides a set of classes which are available to every application program being executed by the computer system which interacts with the computer operating system.

FIG. 13A illustrates a distributed software environment 1350 for providing network applications such as those provided by network 1312. Distributed software environment 1350 is based on middleware 1352 which connects a plurality of platforms 1354 (typically server machines) through platform interfaces 1356 to application 1358 which may consist of a number of software objects running on network 1312. Middleware 1352 is connectivity software that includes a set of enabling services that allow multiple processes running on one or more machines to interact across a network. Middleware 1352 is often used in enterprise software applications, especially when applications are being migrated from mainframe computers to client/server applications running on heterogeneous platforms. Common middleware 1352 embodiments include the Common Object Request Broker Architecture (CORBA) specification published by the Object Management Group and Microsoft's COM/DCOM. These middleware embodiments are known as Object Request Brokers (ORBS) and they are used to implement software environments having a distributed object architecture. When this type of system is used to power a World Wide Web site, it is often referred to as "webware."

The services provided by middleware 1352 include sets of distributed software that exist between application 1358 and the operating system and network services on a system node in a network. Middleware services provide a more functional set of Application Programming Interfaces (APIs) than most operating systems or network services and allow an application to locate transparently across a network, providing interaction with another application or service, be independent from network services, be reliable and available, and scale up in capacity without losing function. It is often desirable to provide applications for use on the Internet based on middleware to provide those applications with the availability and scalability that middleware allows. The user preference elaborating manager 1316 of the invention may advantageously be provided as a portion of, or a plug-in to, middleware software for the purpose of providing user preference functionality to an application (or to client processes) through one or more APIs.

As indicated heretofore, aspects of this invention pertain to specific "methods" and "method functions" implementable on computer systems. Those of ordinary skill in the art should readily appreciate that computer code defining these functions can be delivered to a computer in many forms; including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks. It should be understood, therefore, that such media, when carrying such information, represent alternate embodiments of the present invention.

Having described preferred embodiments of the, invention, one of ordinary skill in the art will now realize further features and advantages of the invention from the above-described embodiments. It should be understood, therefore, that the foregoing is only illustrative of the principles of the invention and that various modifications can be made by those skilled in the art without departing from the scope and spirit of the invention. Accordingly, the invention is not to be limited by what has been particularly shown and described, except as indicated by the appended claims.

What is claimed is:

1. In a system having a plurality of preference objects and at least one user, a method for elaborating a user's preferences in response to a user name, comprising the steps of:
   storing, in at least one membership map of preferences, membership information for each preference object in the plurality of preference objects;
   associating with each preference object in the plurality of preference objects a unique identifier, the unique identifier acting as an index into the at least one membership map of preferences;
   associating with the user name an entitlement expression, the entitlement expression including a reference to the at least one membership map;
   evaluating the entitlement expression to determine whether a preference object in the plurality of preference objects is preferred by a user, the evaluation including looking up the preference object's membership information in the at least one membership map of preferences using the preference object's unique identifier; and
   generating a preference list associated with the user, responsive to the evaluation of the entitlement expression.

2. The method of claim 1, wherein the system further comprises at least one group, each group having a name, zero or more preference objects that are members of the group, and a membership map of preferences for determining whether a particular object is a member of the group, the entitlement expression referencing at least one membership map of preferences by including at least one group name corresponding to a group having a membership map of preferences.

3. The method of claim 2, wherein the entitlement expression comprises a plurality of group names and at least one operator.

4. The method of claim 3, wherein the entitlement expression operator comprises one or more boolean operators.

5. The method of claim 1, wherein each membership map is a bit map.

6. The method of claim 5, wherein the preference object's unique identifier is an index to a position in each bit map wherein the bit at that position indicates whether the preference object is a member of the group corresponding to the bit map.

7. The method of claim 5, wherein the bit map includes at least one bit for each preference object.

8. The method of claim 5, wherein the bit maps are stored in paged data structures.

9. The method of claim 1, wherein the step of evaluating the entitlement expression further comprises determining a preference list for the user name.

10. In a system having a plurality of preference objects, at least one group having a name and having zero or more preference objects as members, and at least one user, a method for elaborating a user's preferences in response to the user's name, comprising the steps of:
    associating with the user name an entitlement expression including at least one group name;
    associating with the at least one group a membership map of preferences indicating whether a preference object in the plurality of preference objects is a member of that group;
    associating with each preference object in the plurality of preference objects a unique identifier usable as an index into each group membership map to determine whether that preference object is a member of that group;

evaluating the entitlement expression associated with the user name to determine whether a preference object in the plurality of preference objects is preferred by the user; and generating a preference list associated with the user, responsive to the evaluation of the entitlement expression.

11. The method of claim 10, wherein each membership map is a bit map.

12. The method of claim 11, wherein the preference object's unique identifier is an index to a position in each bit map wherein the bit at that position indicates whether the preference object is a member of the group corresponding to the bit map.

13. The method of claim 11, wherein the bit map includes at least one bit for each preference object.

14. The method of claim 11, wherein the bit maps are stored in paged data structures.

15. The method of claim 10, wherein each group name is associated with a membership map identifier that represents the location of the membership map for the group.

16. The method of claim 15, wherein the group names and the membership map identifiers associated with the group names are stored in a preference object group store.

17. The method of claim 16, wherein the membership map identifier is a number.

18. The method of claim 17, wherein a preference object group store bit map tacks which membership map identifier numbers are associated with group names and which membership map identifier numbers are available for association with a new group name.

19. The method of claim 10, wherein each preference object has a unique name and each preference object's name and unique identifier are stored in a preference object store.

20. The method of claim 19, wherein the preference object identifier is a number.

21. The method of claim 20, wherein a preference object store bit map tracks which identifier numbers are associated with preference objects and which identifier numbers are available for association with a new preference object.

22. The method of claim 10, wherein the step of evaluating the entitlement expression further comprises determining a preference list for the user name.

23. A system for elaborating user preferences based on a user's name comprising:
a first means for storing a plurality of preference objects and a unique identifier associated with each preference object in the plurality of preference objects;
a second means for storing a plurality of unique preference object group names, each of the plurality of preference object group names associated with a membership map, the unique identifier acting as an index into the preference object group membership maps for determining whether a preference object is a member of a preference object group;
a processor means for determining whether a preference object in the plurality of preference objects is preferred by a user by evaluating an entitlement expression associated with the user name, the entitlement expression including a reference to at least one preference object group: and
a third means for generating a preference list associated with the user, responsive to the evaluation of the entitlement expression.

24. The system of claim 23, further comprising a third means for storing at least one unique user name corresponding to a user and an entitlement expression associated with each user name.

25. The system of claim 23, wherein the processor means comprises a server process responsive to one or more client processes representing preference object associated with the user name.

26. The system of claim 25, wherein the processor means comprises a plurality of threads executing on a server computer for accessing the first and second means and for elaborating user preferences based on information retrieved from the first and second means.

27. In a system having a plurality of preference objects and at least one user, a computer program product comprising a computer readable medium having computer readable program code to direct the system to elaborate user preferences in response to a user name, comprising at least the following steps:
associating with the user name an entitlement expression, the entitlement expression including a reference to at least one membership map of preferences for the preference objects;
associating with the preference object a unique identifier, the unique identifier acting as an index into the at least one membership map;
evaluating the entitlement expression associated with the user name to determine whether a preference object in the plurality of preference objects is preferred by the user, the evaluation including looking up the preference object's membership information in the at least one membership map using the preference object's unique identifier; and
generating a preference list associated with the user, responsive to the evaluation of the entitlement expression.

28. The computer program product of claim 27, wherein the system further comprises at least one group, each group having a name, zero or more preference objects that are members of the group, and a membership map of preferences for determining whether a particular preference object is a member of the group, the entitlement expression referencing at least one membership map by including at least one group name corresponding to a group having a membership map.

29. The computer program product of claim 28, wherein the entitlement expression comprises a plurality of group names and at least one operator.

30. The computer program product of claim 29, wherein the entitlement expression operator comprises one or more boolean operators.

31. The computer program product of claim 27, wherein each membership map is a bitmap.

32. The computer program product of claim 31, wherein the preference object's unique identifier is an index to a position in each bit map wherein the bit at that position indicates whether the preference object is a member of the group corresponding to the bit map.

33. The computer program product of claim 31, wherein the bit map includes at least one bit for each preference object.

34. The computer program product of claim 31, wherein the bit maps are stored in paged data structures.

* * * * *

UNITED STATES PATENT AND TRADEMARK OFFICE
CERTIFICATE OF CORRECTION

PATENT NO. : 7,263,516 B2  Page 1 of 1
APPLICATION NO. : 10/078914
DATED : August 28, 2007
INVENTOR(S) : Graylin et al.

It is certified that error appears in the above-identified patent and that said Letters Patent is hereby corrected as shown below:

Claim 18   col. 17, line 28   "tacks" should be -- tracks --.

Signed and Sealed this

Eleventh Day of March, 2008

JON W. DUDAS
*Director of the United States Patent and Trademark Office*